(12) United States Patent
Fukuda

(10) Patent No.: US 10,477,099 B2
(45) Date of Patent: *Nov. 12, 2019

(54) IMAGE SENSOR AND IMAGE CAPTURING APPARATUS

(71) Applicant: CANON KABUSHIKI KAISHA, Tokyo (JP)

(72) Inventor: Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,173

(22) Filed: May 8, 2018

(65) Prior Publication Data

US 2018/0255231 A1 Sep. 6, 2018

Related U.S. Application Data

(63) Continuation of application No. 15/416,388, filed on Jan. 26, 2017, now Pat. No. 10,015,390.

(30) Foreign Application Priority Data

Jan. 29, 2016 (JP) .................................. 2016-016173
Dec. 1, 2016 (JP) .................................. 2016-234423

(51) Int. Cl.
*H04N 5/232* (2006.01)
*G02B 7/34* (2006.01)
(Continued)

(52) U.S. Cl.
CPC ........... *H04N 5/23212* (2013.01); *G02B 7/34* (2013.01); *G02B 7/365* (2013.01); *H04N 5/23293* (2013.01); *H04N 5/3696* (2013.01)

(58) Field of Classification Search
None
See application file for complete search history.

(56) References Cited

U.S. PATENT DOCUMENTS 4,410,804 A 10/1983 Stauffer
4,755,868 A 7/1988 Hodges
(Continued)

FOREIGN PATENT DOCUMENTS

CN 103780848 A 5/2014
GB 2 548 462 A 9/2017
(Continued)

OTHER PUBLICATIONS

The above foreign patent documents were cited in the May 20, 2019 Japanese Office Action, which is enclosed without an English Translation, that issued in Japanese Patent Application No. 2016234423.

(Continued)

*Primary Examiner* — Cynthia Segura
(74) *Attorney, Agent, or Firm* — Cowan, Liebowitz & Latman, P.C.

(57) ABSTRACT

An image capturing apparatus in which a plurality of pixels each having a plurality of photoelectric conversion units for receiving light fluxes that have passed through different partial pupil regions of an imaging optical system are arrayed, wherein an entrance pupil distance $Z_s$ of the image sensor with respect to a minimum exit pupil distance $L_{min}$ of the imaging optical system and the maximum exit pupil distance $L_{max}$ of the imaging optical system satisfies a condition of $$\frac{4L_{min}L_{max}}{L_{min}+3L_{max}} < Z_S < \frac{4L_{min}L_{max}}{3L_{min}+L_{max}}.$$

20 Claims, 9 Drawing Sheets

(51) Int. Cl.
*G02B 7/36* (2006.01)
*H04N 5/369* (2011.01)

(56) References Cited

U.S. PATENT DOCUMENTS

| | | | |
|---|---|---|---|
| 7,974,017 | B2 | 7/2011 | Katakura |
| 8,390,943 | B2 | 3/2013 | Uemura |
| 9,377,601 | B2 * | 6/2016 | Kusaka ................ G02B 7/34 |
| 10,015,390 | B2 * | 7/2018 | Fukuda ................ G02B 7/34 |
| 2004/0141086 | A1 | 7/2004 | Mihara |
| 2006/0024038 | A1 | 2/2006 | Kawamura et al. |
| 2008/0277566 | A1 | 11/2008 | Utagawa |
| 2011/0122510 | A1 | 5/2011 | Uchida |
| 2011/0228163 | A1 | 9/2011 | Isaka et al. |
| 2012/0002165 | A1 | 1/2012 | Saito |
| 2012/0075729 | A1 | 3/2012 | Uemura |
| 2012/0249846 | A1 | 10/2012 | Nishio et al. |
| 2012/0249852 | A1 | 10/2012 | Fukuda |
| 2013/0057968 | A1 | 3/2013 | Tang et al. |
| 2014/0071322 | A1 * | 3/2014 | Fukuda ............ H04N 5/23212 348/332 |
| 2014/0111681 | A1 | 4/2014 | Fukuda |
| 2014/0226038 | A1 | 8/2014 | Kimura |
| 2015/0015765 | A1 * | 1/2015 | Lee ................ G02B 27/646 348/335 |
| 2015/0296129 | A1 * | 10/2015 | Ishikawa ............ H04N 5/23212 348/349 |
| 2015/0378129 | A1 * | 12/2015 | Yuza ................ G02B 13/004 359/715 |
| 2016/0255267 | A1 * | 9/2016 | Takamiya .......... H04N 5/23212 348/349 |
| 2016/0307326 | A1 * | 10/2016 | Wang ................ G01B 11/22 |
| 2016/0349492 | A1 | 12/2016 | Maetaki |
| 2017/0192209 | A1 | 7/2017 | Yamahiro |
| 2017/0272643 | A1 * | 9/2017 | Tamaki .............. H04N 5/23212 |
| 2017/0295331 | A1 | 10/2017 | Fukuda et al. |
| 2017/0353680 | A1 * | 12/2017 | Fukuda ................ H04N 5/367 |
| 2018/0003923 | A1 * | 1/2018 | Fukuda ................ G02B 7/34 |

FOREIGN PATENT DOCUMENTS

| | | |
|---|---|---|
| JP | 2000-156823 A | 6/2000 |
| JP | 2001-083407 A | 3/2001 |
| JP | 2009-145527 A | 7/2009 |

OTHER PUBLICATIONS

The above foreign patent documents were cited in the Sep. 3, 2019 Chinese Office Action, which is enclosed with an English Translation, that issued in Chinese Patent Application No. 201710051977.X.

* cited by examiner

F I G. 10
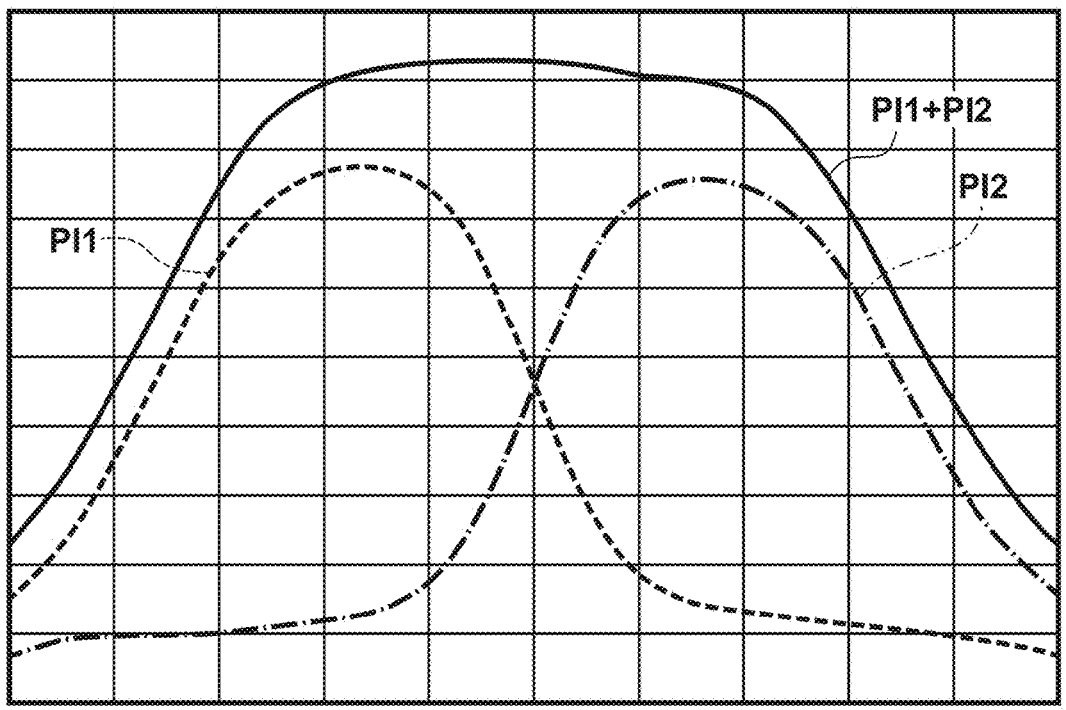

IMAGE SENSOR AND IMAGE CAPTURING APPARATUS

CROSS-REFERENCE TO RELATED APPLICATIONS

This application is a continuation of application Ser. No. 15/416,388, filed Jan. 26, 2017 the entire disclosure of which is hereby incorporated by reference.

BACKGROUND OF THE INVENTION

Field of the Invention

The present invention relates to an image sensor and an image capturing apparatus.

Description of the Related Art

As a focus detection method performed by an image capturing apparatus, an on-imaging surface phase difference method is used in which focus detection by a phase difference method is performed using focus detection pixels formed in an image sensor.

U.S. Pat. No. 4,410,804 discloses an image capturing apparatus using a two-dimensional image sensor in which one microlens and a plurality of photoelectric conversion, units are formed in each pixel. The plurality of photoelectric conversion units are configured to receive light components that have passed through different regions of the exit pupil of an imaging lens via one microlens, thereby dividing the pupil. A correlation amount is calculated from focus detection signals output from pixels (focus detection pixels) each including a plurality of photoelectric conversion units, and an image shift amount is obtained from the correlation amount, thereby performing focus detection by the phase difference method. Further, Japanese Patent Laid-Open No. 2001-083407 discloses generating an image signal by adding focus detection signals output from a plurality of photoelectric conversion units for each pixel.

Japanese Patent Laid-Open No. 2000-156823 discloses an image capturing apparatus in which pairs of focus detection pixels are partially arranged in a two-dimensional image sensor formed from a plurality of imaging pixels. The pairs of focus detection pixels are configured to receive light components from different regions of the exit pupil of an imaging lens via a light shielding layer having openings, thereby dividing the pupil. An image signal is acquired by imaging pixels arranged on most part of the two-dimensional image sensor. A correlation amount is calculated from focus detection signals of the partially arranged focus detection pixels, and an image shift amount is obtained from the calculated correlation amount, thereby performing focus detection by the phase difference method, as disclosed.

In focus detection using the on-imaging surface phase difference method, the defocus direction and the defocus amount can simultaneously be detected by focus detection pixels formed in an image sensor. It is therefore possible to perform focus control at a high speed.

However, in the on-imaging surface phase difference method, there is a problem in that, when a variation range of an incident angle of light from an imaging lens (imaging optical system) on an image sensor at a peripheral portion is large, a pupil deviation between an entrance pupil of a sensor and an exit pupil of the imaging lens is large, and the base line length is not secured, and consequently there is a case in which the focus detection quality by the on-imaging surface phase difference method deteriorates.

SUMMARY OF THE INVENTION

The present invention has been made in consideration of the above situation, and realizes focus detection by the on-imaging surface phase difference method under a wide range of conditions in a case where a variation range of an incident. angle of light from an imaging optical system on an image sensor at a peripheral portion is large.

According to the present invention, provided is an image capturing apparatus in which a plurality of pixels each having a plurality of photoelectric conversion units for receiving light fluxes that have passed through different partial pupil regions of an imaging optical system are arrayed, wherein an entrance pupil distance $Z_s$ of the image sensor with respect to a minimum exit pupil distance $L_{min}$ of the imaging optical system and the maximum exit pupil distance $L_{max}$ of the imaging optical system satisfies a condition of $$\frac{4L_{min}L_{max}}{L_{min}+3L_{max}} < Z_S < \frac{4L_{min}L_{max}}{3L_{min}+L_{max}}.$$

Further, according to the present invention, provided is an image sensor in which a plurality of pixels each having a plurality of photoelectric conversion units for receiving light fluxes that have passed through different partial pupil regions of an imaging optical system are arrayed, wherein an entrance pupil distance $Z_s$ of the image sensor with respect to a maximum image height R of the image sensor satisfies the condition of $2.33R<Z_s<6.99R$.

Furthermore, according to the present invention, provided is an image sensor in which a plurality of pixels each having a plurality of photoelectric conversion units for receiving light fluxes that have passed through different partial pupil regions of an imaging optical system are arrayed, wherein a maximum image height and an entrance pupil distance of the image sensor is determined such that a deviation amount between the entrance pupil of the image sensor and an exit pupil of the imaging optical system with respect to each of the plurality of photoelectric conversion units falls within a predetermined range.

Further, according to the present invention, provided is an image capturing apparatus that is capable of connecting to an exchangeable imaging optical system comprising the image sensor as described above.

Further, according to the present invention, provided is an image capturing apparatus comprising: the imaging optical system; and the image sensor as described above.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a diagram, showing an example of pupil intensity distribution according to the embodiment.

DESCRIPTION OF THE EMBODIMENTS

Exemplary embodiments of the present invention, will be described in detail in accordance with the accompanying drawings.

Overall Arrangement

Figure 1:
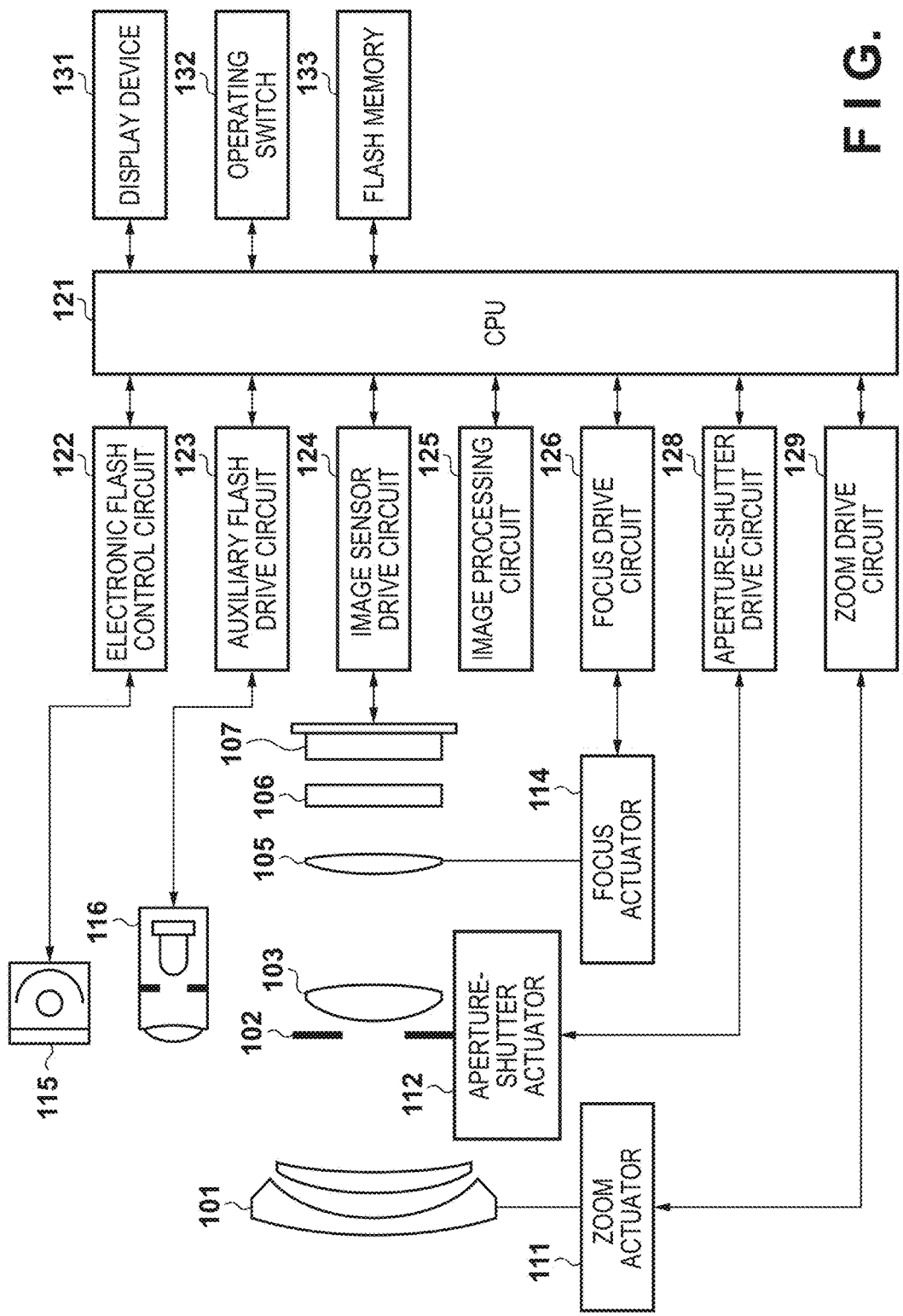
FIG. 1 is a schematic block diagram of an image capturing apparatus according to an embodiment of the present invention.

FIG. 1 is a diagram showing a brief configuration of a camera as an example of an image capturing apparatus having an image sensor according to an embodiment of the present invention. In FIG. 1, a first lens group 101 is disposed on the front end of an imaging optical system, and supported so as to foe movable forward and backward along an optical axis. An aperture-shutter shutter 102 adjusts the diameter of its opening, thereby adjusting the amount of light during image sensing, and also has a function to adjust the exposure time during still image sensing. The aperture-shutter 102 and a second lens group 103 move together forward and backward along the optical axis, and, in conjunction with the movement forward and backward of the first lens group 101, provide a magnification change effect (a zoom function).

A third lens group 105 (focus lens) carries out focus adjustment by moving forward and backward along the optical axis. A low-pass optical filter 106 is an optical element for the purpose of reducing false color and moiré of a sensed image. An image sensor 107 is composed of a two-dimensional CMOS photo sensor and the surrounding circuitry, and disposed on an imaging plane of the imaging optical system.

A zoom actuator 111 carries out a magnification-change operation by rotation of a cam barrel, not shown, to move the first lens group 101 through the second lens group 103 forward and backward along the optical axis. An aperture-shutter actuator 112 controls the diameter of the opening of the aperture-shutter 102 and adjusts the amount of light for image sensing, and also controls the exposure time during still image sensing. A focus actuator 114 moves the third lens group 105 forward and backward along the optical axis to adjust the focus.

An electronic flash 115 for illuminating an object is used during image sensing. A flash illumination device that, uses a Xenon tube is preferable, but an illumination device comprised of a continuous-flash LED may also be used. An AF auxiliary flash unit 116 projects an image of a mask having a predetermined opening pattern onto an object field through a projective lens to improve focus detection capability with respect to dark objects and low-contrast objects.

The CPU 121 controls the camera main unit in various ways within the image capturing apparatus. The CPU 121 may, for example, have a calculation unit, ROM, RAM, A/D converter, D/A converter, communication interface circuitry, and so forth. In addition, the CPU 121, based on predetermined programs stored in the ROM, drives the various circuits that the camera has, and executes a set of operations of AF, image sensing, image processing, and recording.

An electronic flash control circuit 122 controls firing of the electronic flash 115 in synchrony with an image sensing operation. An auxiliary flash drive circuit 123 controls firing of the AF auxiliary flash unit 116 in synchrony with a focus detection operation. An image sensor drive circuit 124 controls the image sensing operation of the image sensor 107 as well as A/D-converts acquired image signals and transmits the converted image signals to the CPU 121. An image processing circuit 125 performs such processing as γ conversion, color interpolation, JPEG compression and the like on the images acquired by the image sensor 107.

A focus drive circuit 126 controls the drive of the focus actuator 114 based on the focus detection result to drive the third lens group 105 reciprocally in the optical axis direction, thereby performing focus adjustment. An aperture-shutter drive circuit 128 controls the drive of the aperture-shutter actuator 112, thereby driving the opening of the aperture-shutter 102. A zoom drive circuit 129 drives the zoom actuator 111 in accordance with the zoom operation of the user.

A display device 131, such as an LCD, displays information relating to the image sensing mode of the camera, preview images before image sensing, confirmation images after image sensing, focus state display images during focus detection, and the like. An operating switch group 132 is composed of a power switch, a release (image sensing trigger) switch, a zoom operation switch, an image sensing mode selection switch, and the like. A detachable flash memory 133 records captured images.

Image Sensor

Figure 2:
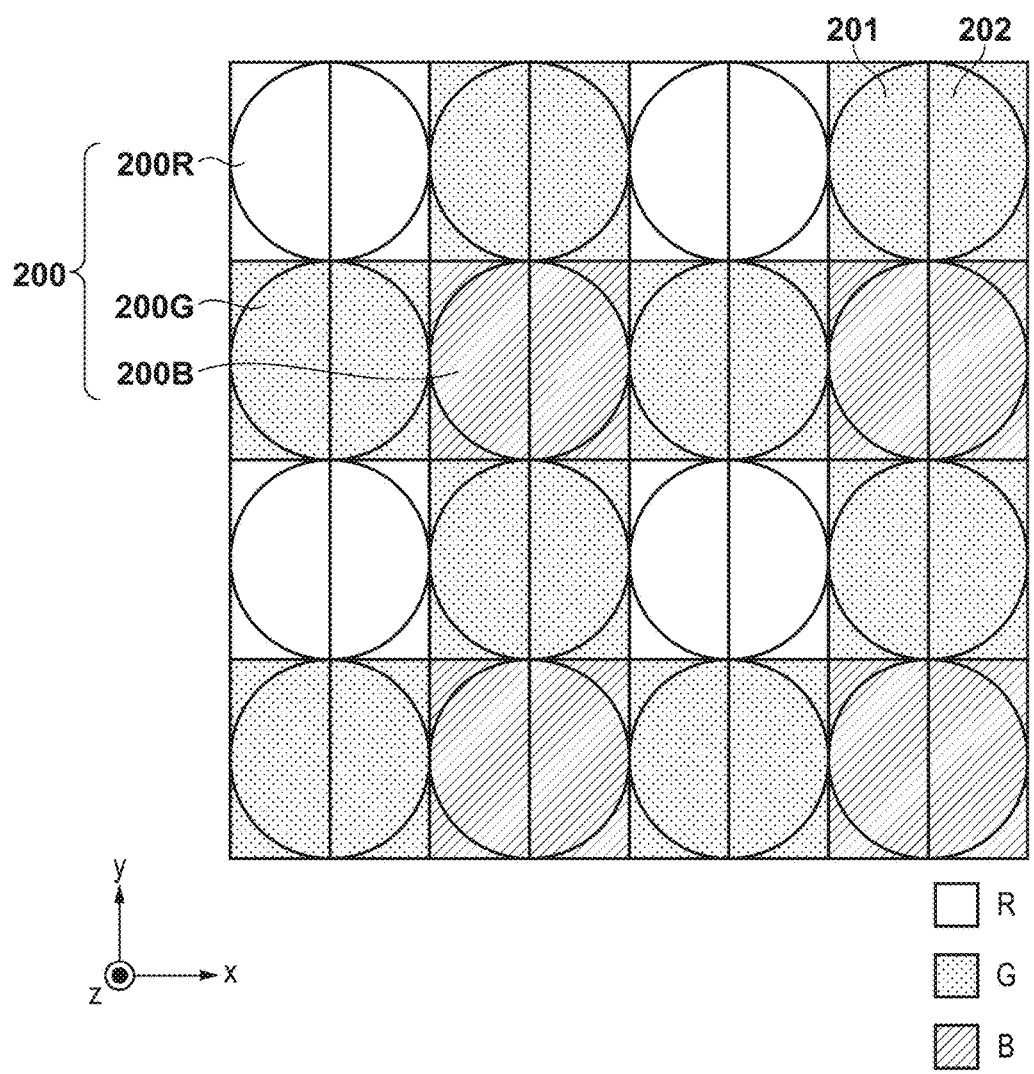
FIG. 2 is a schematic view of a pixel array according to the embodiment.

FIG. 2 shows the outline of an array of the imaging pixels and the focus detection pixels of the image sensor 107 according to the embodiment. FIG. 2 illustrates the pixel (imaging pixel) array within the range of 4 columns×4 rows and the focus detection pixel array within the range of 8 columns×4 rows in the two-dimensional CMOS sensor (image sensor) according to this embodiment.

A pixel group 200 includes pixels of 2 columns×2 rows. A pixel 200R having an R (red) spectral sensitivity is arranged at the upper left position, pixels 200G having a G (green) spectral sensitivity are arranged at the upper right and lower left positions, and a pixel 200B having a B (blue) spectral sensitivity is arranged at the lower right position. Each pixel is formed from a first focus detection pixel 201 and a second focus detection pixel 202 arrayed in 2 columns×1 row.

A number of arrays of 4 (columns)×4 (rows) pixels (8 (columns)×4 (rows) focus detection pixels) shown in FIG. 2 are arranged on a plane to enable to capture an image (focus detection signal). In the embodiment, the image sensor will be described assuming that the horizontal size H is 36 mm, and the vertical size V is 24 mm, a period P of pixels is 4.8 µm, the number N of pixels is 7,500 columns in horizontal direction×5,000 rows in vertical direction=37,500,000, a column-direction period PAF of focus detection pixels is 2.4 µm, and the number NAF of focus detection pixels is 15,000 columns in horizontal direction×5,000 rows in vertical direction=75,000,000.

Figure 3A:
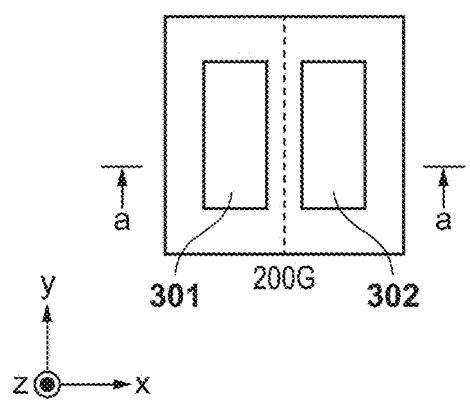
FIGS. 3A and 3B are a schematic plan view and a schematic sectional view, respectively, of a pixel according to the embodiment.
Figure 3B:
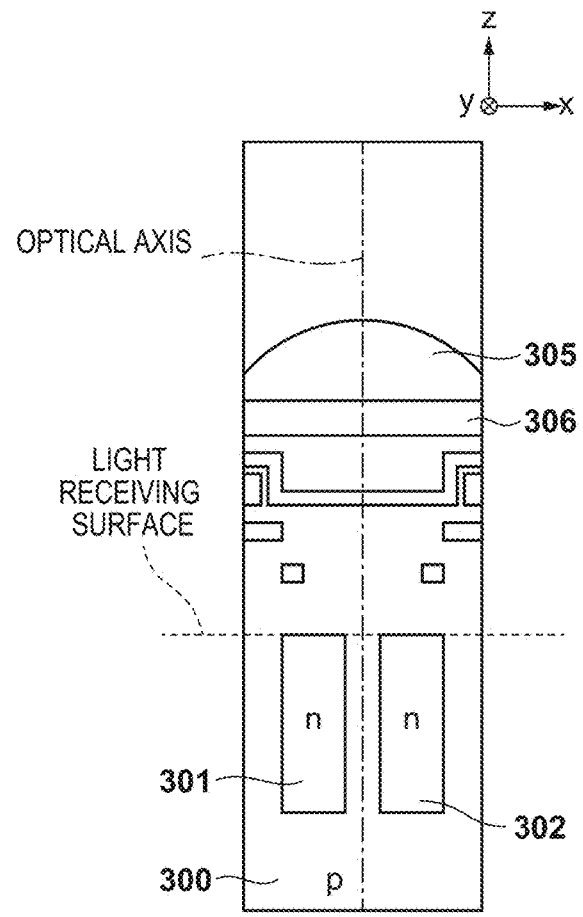

FIG. 3A is a plan view of one pixel 200G of the image sensor 107 shown in FIG. 2 when viewed from the light receiving surface side (+z side) of the image sensor 107, and FIG. 3B is a sectional view showing the a-a section in FIG. 3A viewed from the −y side. As shown in FIGS. 3A and 3B, in the pixel 200G according to this embodiment, a microlens 305 for condensing incident light is formed on the light receiving side of each pixel. The pixel is divided by NH (here, divided by two) in the x direction and divided by NV (here, divided by one, or not divided) in the y direction to form photoelectric conversion units 301 and 302. The photoelectric conversion units 301 and 302 correspond to the first focus detection pixel 201 and the second focus detection pixel 202, respectively.

Each of the photoelectric conversion units 301 and 302 may be formed as a pin structure photodiode including an intrinsic layer between a p-type layer and an n-type layer or a p-n junction photodiode without an intrinsic layer, as needed.

In each pixel, a color filter 306 is formed between the microlens 305 and the photoelectric conversion units 301 and 302. The spectral transmittance of the color filter may be changed between the focus detection pixels, as needed, or the color filter may be omitted.

Light that has entered the pixel 200G shown in FIGS. 3A and 3B is condensed by the microlens 305, spectrally split by the color filter 306, and received by the photoelectric conversion units 301 and 302. In the photoelectric conversion units 301 and 302, electron-hole pairs are produced in accordance with the received light amount and separated in the depletion layer. Electrons having negative charges are accumulated in the n-type layers (not shown). On the other hand, holes are discharged externally from the image sensor 107 through the p-type layers connected to a constant voltage source (not shown). The electrons accumulated in the n-type layers (not shown) of the photoelectric conversion units 301 and 302 are transferred to electrostatic capacitances (FDs) through transfer gates, converted into voltage signals, and output. Note that the focus position of the microlens 305 changes in accordance with its shape (curvature, for example), material (index of refraction, for example), and positional relationship with respect to corresponding photoelectric conversion units, and so on. By setting these parameters, it is possible to set the focus position of the microlens 305.

The pixels 200R and 200B shown in FIG. 2 also have the similar structure as the pixel 200G, and output voltage signals corresponding to the light spectrally split by the color filter 306, in a similar manner as the pixel 200G.

Figure 4:
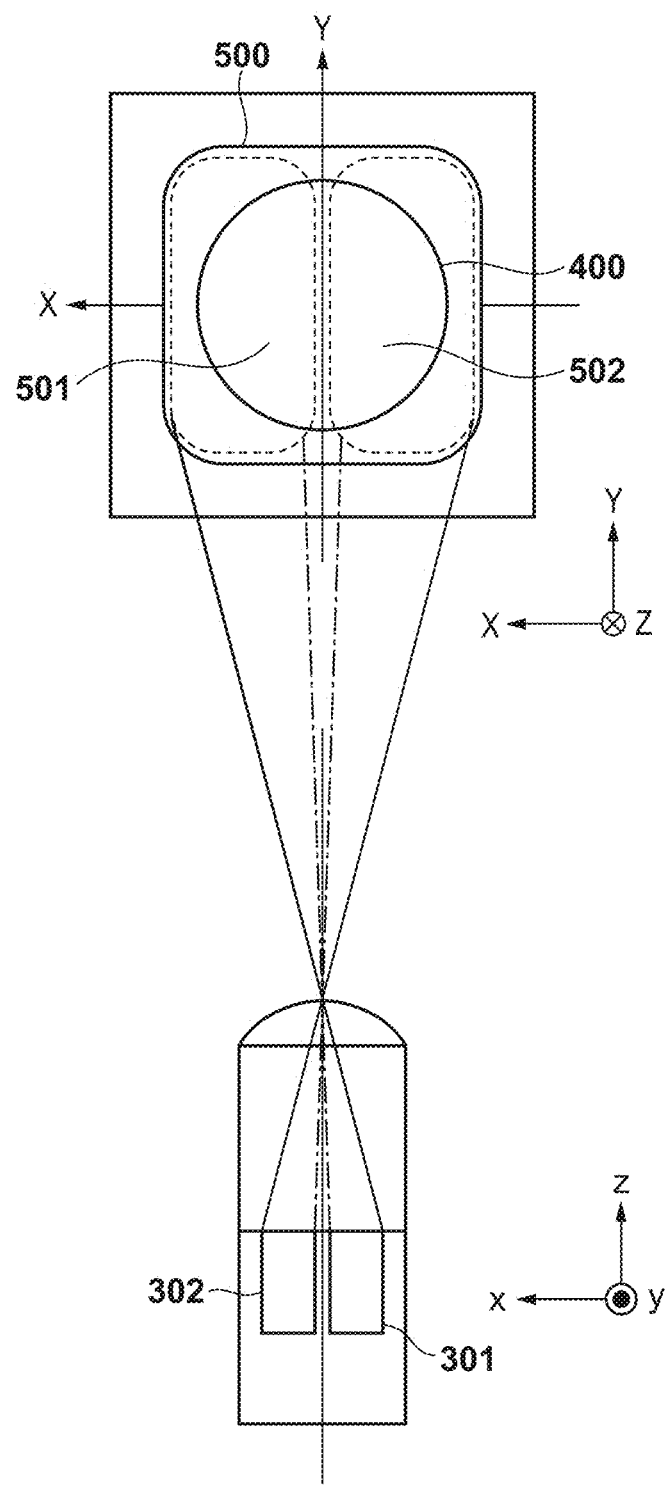
FIG. 4 is a schematic explanatory view of a pixel structure and pupil division according to the embodiment.

The correspondence between pupil division and the pixel structure according to this embodiment shown in FIGS. 3A and 3B will be described with reference to FIG. 4. FIG. 4 illustrates a sectional view showing the a-a section of the pixel structure according to the embodiment shown in FIG. 3A viewed from the +y side and the exit pupil plane of an imaging optical system. Note that in FIG. 4, to obtain correspondence with the coordinate axes of the exit pupil plane, the x- and y-axes of the sectional view are reversed with respect to those of FIGS. 3A and 3B.

A first partial pupil region 501 of the first focus detection pixel 201 represents a pupil region that is almost conjugate with the light receiving surface of the photoelectric conversion unit 301 having a center of gravity decentered in the −x direction via the microlens 305, and light beams that have passed through the first partial pupil region 501 are received by the first focus detection pixel 201. The first partial pupil region 501 of the first focus defection pixel 201 has a center of gravity decentered to the +x side on the pupil plane.

A second partial pupil region 502 of the second focus detection pixel 202 represents a pupil region that is almost conjugate with the light receiving surface of the photoelectric conversion unit 302 having a center of gravity decentered in the +x direction via the microlens 305, and light beams that have passed through the second partial pupil region 502 are received by the second focus detection pixel 202. The second partial pupil region 502 of the second focus detection pixel 202 has a center of gravity decentered to the −x side on the pupil plane.

Light beams that have passed through a pupil region 500 are received by the whole pixel 200G including the photoelectric conversion units 301 and 302 (first focus detection pixel 201 and the second focus detection pixel 202). Reference numeral 400 denotes an opening of the aperture-shutter 102.

Figure 5:
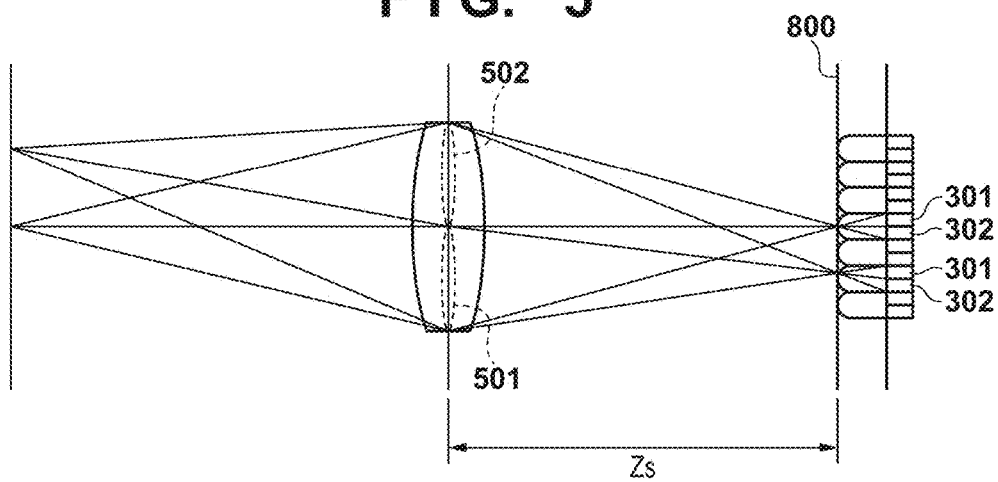
FIG. 5 is a schematic explanatory view of an image sensor and pupil division according to the embodiment.

FIG. 5 is a schematic view showing the correspondence between the image sensor and pupil division according to the embodiment. It is configured so that, at a sensor entrance pupil distance $Z_s$, the first partial pupil region 501 corresponding to a light receiving region of the first focus detection pixel 201 of each pixel arranged at each position on the surface of the image sensor 107 substantially matches. Similarly, it is configured so that the second partial pupil region 502 corresponding to a light receiving region of the second focus detection pixel 202 of each pixel substantially matches. In other words, it is configured so that a pupil division position between the first partial pupil region 501 and the second partial pupil region 502 for each pixel of the image sensor 107 substantially matches at the sensor entrance pupil distance $Z_s$. The first partial pupil region 501 and the second partial pupil region 502 are referred to as "sensor entrance pupil", hereinafter. A pair of light fluxes that have passed through the different partial pupil regions of an imaging optical system, namely, the first partial pupil region 501 and the second partial pupil region 502 are incident on each pixel of the image sensor 107 at different incident angles, and received by the first focus detection pixel 201 and the second focus detection pixel 202 which are divided to 2×1. The present embodiment shows a case where the pupil region is divided into two in the horizontal direction. However, the pupil region may be divided in the vertical direction as needed.

Figures 9A, 9B:
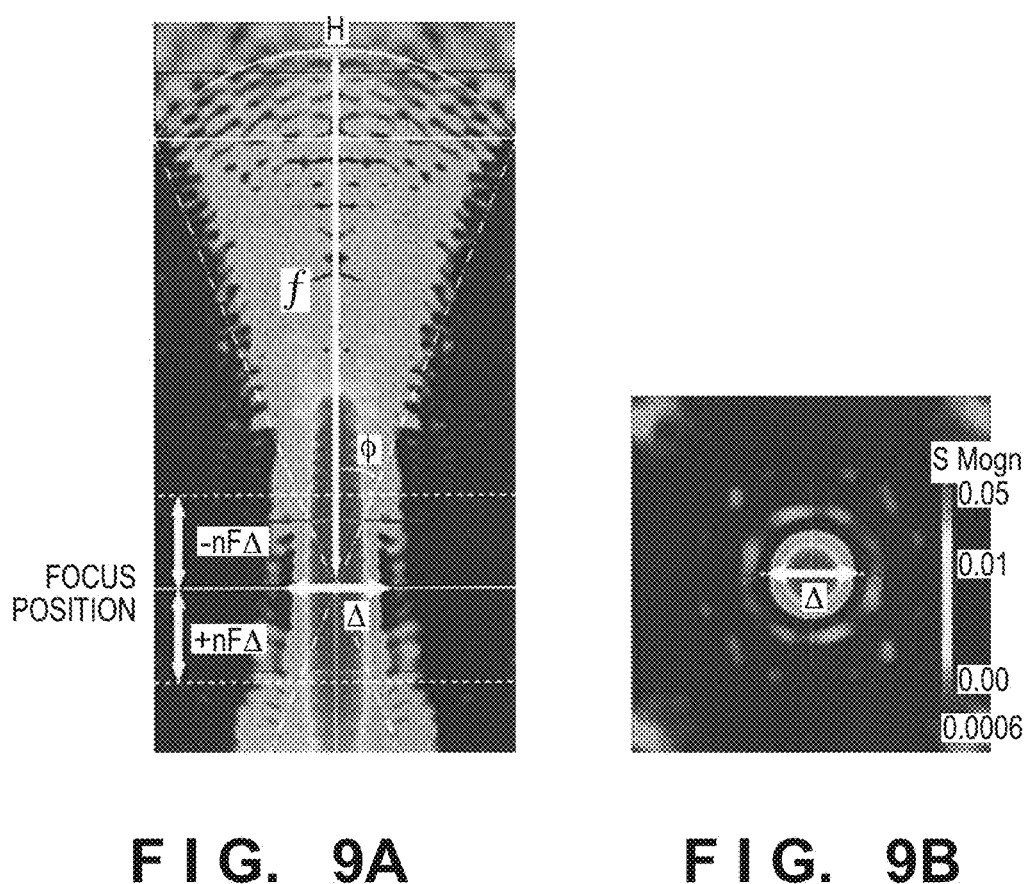
FIGS. 9A and 9B are diagrams showing an example of light intensity distribution within a pixel according to the embodiment.

FIGS. 9A and 9B show light intensity distributions in a case where light is incident on a microlens formed in each pixel. FIG. 9A shows a light intensity distribution of a cross section of the microlens that is parallel to the optical axis of the microlens. FIG. 9B shows a light intensity distribution of a cross section of the microlens that is perpendicular to the optical axis of the microlens at a focus position of the microlens. Incident light is converged by the microlens to the focus position. However, due to diffraction caused by the fluctuation of light, it is not possible to make the diameter of a concentration spot of light smaller than the diffraction limit Δ, and must have a finite size. The size of the light receiving surface of a photoelectric conversion unit is about 1 to 2 µm, whereas the size of the concentration spot of the microlens is about 1 μm. Therefore, the first partial pupil region 501 and the second partial pupil region 502 in FIG. 4 which are conjugate with the light receiving surface of the photoelectric conversion unit with respect to the microlens are not pupil divided precisely due to diffraction blur, and receive light in accordance with light receiving rate distribution (pupil intensity distribution) that depends on an incident angle of light.

FIG. 10 shows an example of the light receiving rate distribution (pupil intensity distribution) that depends on an incident angle of light. The abscissa indicates an incident angle of light θ (can be converted to pupil coordinates), and the ordinate indicates a light receiving rate. A curve PI1(θ) shown by a broken line in FIG. 10 illustrates: a pupil intensity distribution of the first partial pupil region 501 in FIG. 4 along the X axis, and a curve PI2(θ) shown by a dot-dash line illustrates a pupil intensity distribution of the second partial pupil region along the X axis. Further, a curve PI(η) (= PI1(θ)+PI2(θ)) shown by a solid line illustrates a pupil intensity distribution of the total pupil region 500 of the first partial pupil region 501 and the second partial pupil region 502 in FIG. 4 along the X axis. As shown in FIG. 10, it will be understood that the pupil is divided gradually.

The embodiment shows an example in which the pupil region is divided into two in the horizontal direction. However, the pupil region may be divided in the vertical direction as needed.

It should be noted that, in the aforesaid example, a plurality of image sensing pixels each formed with the first focus detection pixel and the second focus detection pixel are arrayed, however, the present invention is not limited to this. The image sensing pixels, the first focus detection pixels and the second focus detection pixels may be formed independently, and the first focus detection pixels and the second focus detection pixels may be partially provided among an array of the image sensing pixels.

In this embodiment, the first focus detection signal is formed by collecting signals corresponding to received light from the first focus detection pixels 201 of the respective pixels of the image sensor, the second focus detection signal is formed by collecting signals corresponding to received light from the second focus detection pixels 202 of the respective pixels of the image sensor, and perform focus detection using the first and second focus detection signals. Further, by adding the signals from the first focus detection pixels 201 and the second focus detection pixels 202 for each pixel of the image sensor 107, an image signal (a captured image) with the resolution corresponding to the number of the effective pixels N is generated.

Pupil Deviation

Figure 6:
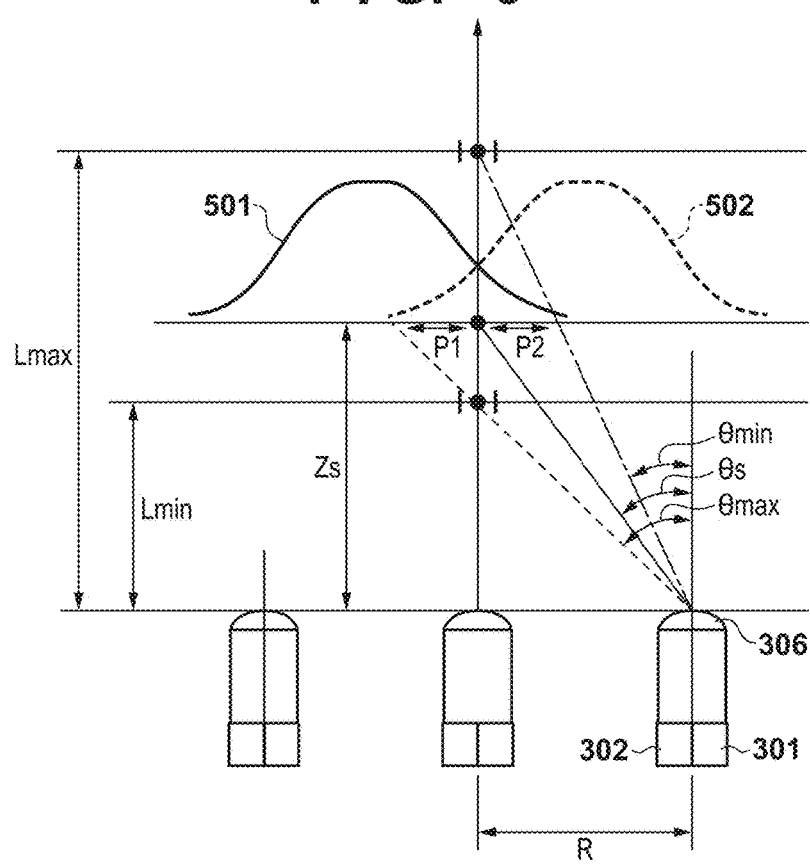
FIG. 6 is a schematic explanatory view for explaining correspondence between an entrance pupil of an image sensor and a pupil shift amount between the entrance pupil and an exit pupil of an imaging optical system according to the embodiment.

FIG. 6 is a schematic explanatory view of corresponding relationship of a pupil deviation between the entrance pupil of the image sensor 107 of this embodiment (referred to as "sensor entrance pupil", hereinafter) and the exit pupil of the imaging optical system (referred to as "imaging lens exit pupil", hereinafter). In FIG. 6, let the entrance pupil distance of the image sensor 107 (referred to as "sensor entrance pupil distance", hereinafter) be $Z_s$, the maximum image height of the image sensor 107 be R, the minimum exit pupil distance of the imaging optical system be $L_{min}$, and the maximum exit pupil distance of the imaging optical system be $L_{max}$. The maximum image height R of the image sensor 107 is $R^2=(0.5\times H)^2+(0.5\times V)^2$, with the horizontal size of the image sensor 107 being H, and the vertical size of the image sensor 107 being V. The exit pupil distance of the imaging optical system changes between the minimum exit pupil distance $L_{min}$ and the maximum exit pupil distance $L_{max}$ in accordance with the exchange of the imaging lens in a case of lens exchangeable camera, changes in a zoom ratio, focus state, and aperture of the imaging lens. Further, in this embodiment, the image height is an amount determined independent of the image height of the imaging lens, and used as a position from the center of the image sensor 107 or the position from the center of a sensed image. Therefore, although calculation of the maximum image height R has been explained using the horizontal size H and the vertical size V, these sizes do not necessarily coincide with the size of the image sensor 107. For example, the maximum image height R may be the maximum image height of an image to be displayed on the display device 131, in which case, the maximum image height R may be smaller than the size of the image sensor 107 by an amount of a margin used for image processing and image stabilization. Further, the maximum image height R may be the maximum image height of an image portion to be stored as image data. In this case, the image portion substantially coincides with an area in which calculation for the focus detection is performed.

At the sensor entrance pupil distance $Z_s$, the first partial pupil region 501 which is a light receiving region (entrance pupil) of the first focus detection pixel 201 of each pixel of the image sensor 107 and the second partial pupil region 502 which is a light receiving region of the second focus detection pixel 202 intersect substantially on the optical axis. Considering the overlapping of the first partial pupil region 501 and the second partial pupil region 502, which are the sensor entrance pupil, and the imaging lens exit pupil at the sensor entrance pupil distance $Z_s$, a pupil deviation amount between the sensor entrance pupil and the imaging lens exit pupil with the minimum exit pupil distance $L_{min}$ is P1. Similarly, a pupil deviation amount between the sensor entrance pupil and the imaging lens exit pupil with the maximum exit pupil distance $L_{max}$ is P2. If either of the pupil deviation amount P1 or the pupil deviation amount P2 between the sensor entrance pupil and the imaging lens exit pupil is large, the base-line length is not secured, and there is case in which the focus detection performance by the phase difference AF deteriorates.

Accordingly, in the present embodiment, it is configured such that the sensor entrance pupil distance $Z_s$ satisfies the following condition so that the pupil deviation amounts P1 and P2 are restrained.

First, let an incident angle of light on a pixel located at the maximum image height R of the image sensor 107 from the sensor entrance pupil distance $Z_s$ on the optical axis be $\theta_s$, an incident angle of light on the same pixel from the minimum exit pupil distance $L_{min}$ on the optical axis be $\theta_{max}$, and an incident angle of light on the same pixel from the maximum exit pupil distance $L_{max}$ on the optical axis be $\theta_{min}$. In order to restrain the pupil deviation amounts P1 and P2 to secure the base-line length, in this embodiment, the angle $\theta_s$ is set within a range that satisfies the following expression (1) which defines a neighboring range of an average incident angle.

$$\frac{\theta_{max}+3\theta_{min}}{4}<\theta_S<\frac{3\theta_{max}+\theta_{min}}{4} \qquad (1)$$

Further, $\theta_s$, $\theta_{max}$, and $\theta_{min}$ can be approximated by the following expressions (2).

$$\theta_S \cong \tan\theta_S = \frac{R}{Z_S} \quad (2)$$

$$\theta_{max} \cong \tan\theta_{max} = \frac{R}{L_{min}}$$

$$\theta_{min} \cong \tan\theta_{min} = \frac{R}{L_{max}}$$

By substituting the expression (2) to the expression (1), the following expression (3) that shows the condition that the sensor entrance pupil distance $Z_s$ should satisfy is obtained.

$$\frac{4L_{min}L_{max}}{L_{min}+3L_{max}} < Z_S < \frac{4L_{min}L_{max}}{3L_{min}+L_{max}} \quad (3)$$

Therefore, in this embodiment, in order to restrain the pupil deviation amounts P1 and P2 and secure the base-line length, it is configured so that the entrance pupil distance $Z_s$ of the image sensor 107 satisfies the expression (3) with the minimum exit pupil distance $L_{min}$ and the maximum exit pupil distance $L_{max}$ of the imaging optical system.

In a case of a lens exchangeable camera, lenses with various optical conditions, from the wide angle lenses to telephoto lenses may be attached. In this case, as a condition for the maximum exit pupil distance $L_{max}$ of the imaging optical system, it is desired to set $L_{max}=\infty$ in order to cope with the telecentric optical lens. Further, as a condition for the minimum exit pupil distance $L_{min}$ of the imaging optical system, it is desired to restrain a marginal illumination decrease expressed by the cosine fourth law with respect to the center image height to equal to or less than ½ (half). Therefore, under the condition of $\cos^4(\theta_{max})=\frac{1}{2}$, it is desired that the maximum incident angle $\theta_{max}$ of light that incidents on the pixel located at the maximum image height R of the image sensor 107 from the minimum exit pupil distance $L_{min}$ on the optical axis is $\theta_{max}=32.8°=0.572$ [rad]. Accordingly, from the expression (2), with the maximum image height R of the image sensor 107, it is desired that minimum exit pupil distance $L_{min}$ is $L_{min}=R/0.572$.

By substituting $L_{min}=R/0.572$ and $L_{max}=\infty$ in the expression (3), the following condition expression (4) for the sensor entrance pupil distance $Z_s$ is obtained.

$$2.33R < Z_s < 6.99R \quad (4)$$

In this embodiment, since the horizontal size H of the image sensor 107 is 36 mm, the vertical size V of the same is 24 mm, and the maximum image height R of the same is 21.63 mm, the condition expression (4) for the sensor entrance pupil distance $Z_s$ is 50.4 mm<$Z_s$<151.2 mm.

Further, the condition of the minimum exit pupil distance $L_{min}$ of the imaging optical system may be determined on the basis of the pupil intensity distribution of the pupil region 500 which is a combined area of the first partial pupil region 501 and the second partial pupil region 502 of the image sensor 107. Here, the pupil intensity distribution of the pupil region 500 at the central image height is denoted by PI0($\theta$), and the pupil intensity distribution of the pupil region 500 at the maximum image height R is denoted by PIR($\theta$). As the condition of the minimum exit pupil distance $L_{min}$ of the imaging optical system, it is desirable to restrain a decrease in the pupil intensity distribution PIR ($\theta=\theta_{max\_PIR}$) at the incident angle $\theta_{max\_PIR}$ [rad] at the maximum image height R to ½ (half) or less tha n the pupil intensity distribution PI0 ($\theta=0$) at the incident angle 0[rad] at the central image height. Therefore, it is desirable to determine the incident angle $\theta_{max\_PIR}$ of light from the minimum exit pupil distance $L_{min}$ on the optical axis based on the condition of PIR ($\theta=\theta_{max\_PIR}$)=0.5×PI0 ($\theta=0$), and determine the minimum exit pupil distance $L_{min}=R/\theta_{max\_PIR}$ from the expression (2).

By substituting $L_{min}=R/\theta_{max\_PIR}$ and $L_{max}=\infty$ to the expression (3), the condition expression (5) of the sensor entrance pupil distance $Z_s$ is obtained.

$$\frac{4}{3}\frac{R}{\theta_{max\_PIR}} < Z_S < 4\frac{R}{\theta_{max\_PIR}} \quad (5)$$

As described above, the image sensor of the embodiment has a configuration in which a plurality of pixels are arrayed, wherein each pixel has a plurality of photoelectric conversion units for receiving light fluxes that have passed through different partial pupil regions of the imaging optical system, and in which the sensor entrance pupil distance $Z_s$ satisfies the expression (3) with respect to the minimum exit pupil distance $L_{min}$ of the imaging optical system and the maximum exit pupil distance $L_{max}$ of the imaging optical system.

Further, the image sensor of the embodiment has a configuration in which a plurality of pixels are arrayed, wherein each pixel has a plurality of photoelectric conversion units for receiving light fluxes that have passed through different partial pupil regions of the imaging optical system, and in which the sensor entrance pupil distance $Z_s$ satisfies the expression (4) with respect to the maximum image height R of the image sensor.

With the configuration as described above, the focus detection by the on-imaging surface phase difference method is possible over a wide range of conditions in a case where a changing range of the incident angle of light from the imaging optical system on a pixel at a peripheral image height of the image sensor is large.

Modification

In the first embodiment as described above, each pixel of the image sensor 107 is divided by 2 in the x direction, and by 1 (or not divided) in the y direction. However, the present invention is not limited to this, an image sensor 107 comprises pixels that are divided by different numbers and different ways from the pixels shown in FIG. 2.

Figure 7:
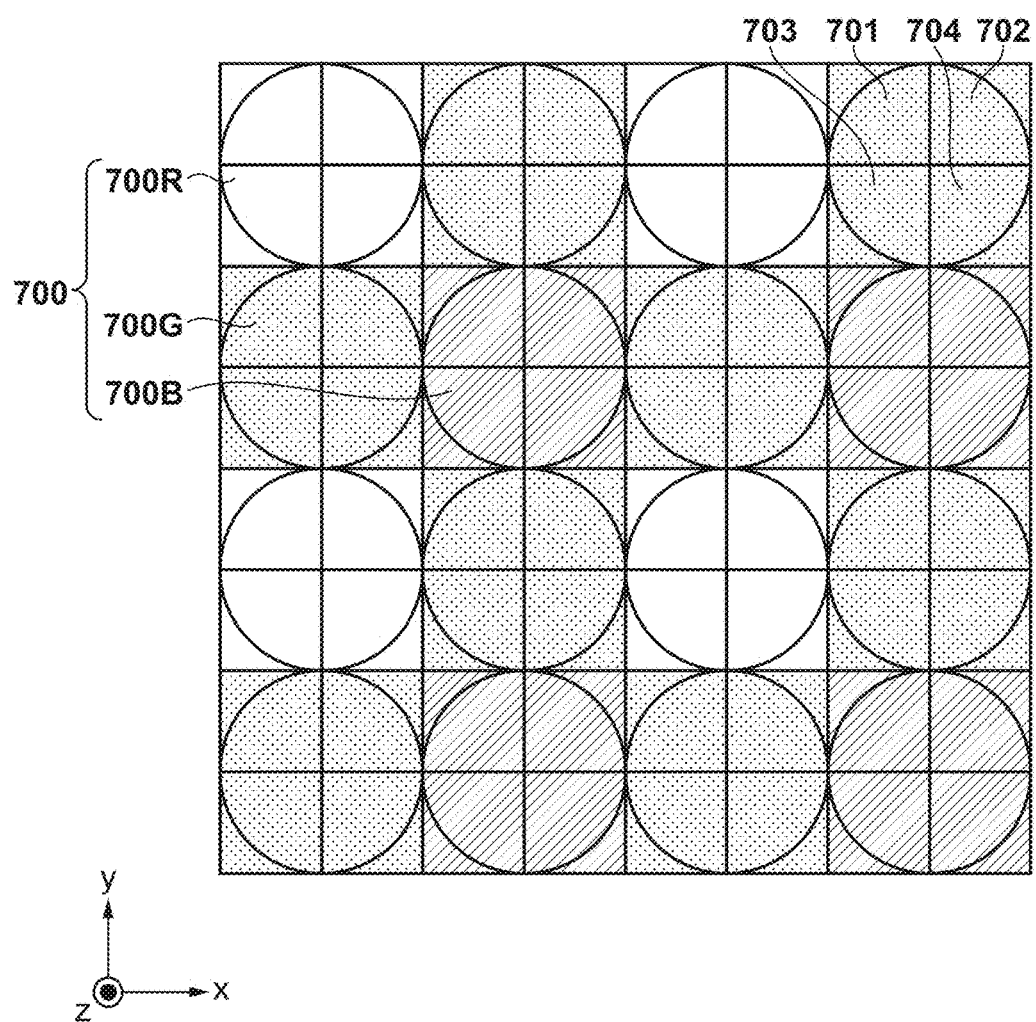
FIG. 7 is a schematic view of a pixel array according to a modification.

FIG. 7 shows the outline of the imaging pixels and the array of focus detection pixels of the image sensor 107 according to the modification. FIG. 7 illustrates the pixel (imaging pixel) array within the range of 4 columns×4 rows and the focus detection pixel array within the range of 8 columns×8 rows in the two-dimensional CMOS sensor (image sensor) according to the modification.

In this modification, a pixel group 700 shown in FIG. 7 includes pixels of 2 columns×2 rows. A pixel 700R having an R (red) spectral sensitivity is arranged at the upper left position, pixels 700G having a G (green) spectral sensitivity are arranged at the upper right and lower left positions, and a pixel 700B having a B (blue) spectral sensitivity is arranged at the lower right position. Each pixel is formed from a first focus detection pixel 701 to a fourth focus detection pixel 704 arrayed in 2 columns×2 rows.

A number of arrays of 4 (columns)×4 (rows) pixels (8 (columns)×8 (rows) focus detection pixels) shown in FIG. 7 are arranged on a plane to enable to capture an image (focus detection signal). In the modification, the image sensor will be described assuming that the horizontal size H is 36 mm, vertical size V is 24 mm, a period P of pixels is 4.8 µm, the number N of pixels is 7,500 columns in horizontal direction×5,000 rows in vertical direction=37,500,000, a column-direction period PSUB of focus detection pixels is 2.4 µm, and the number NSUB of focus detection pixels is 15,000 columns in horizontal direction×10,000 rows in vertical direction=150,000,000.

Figure 8A:
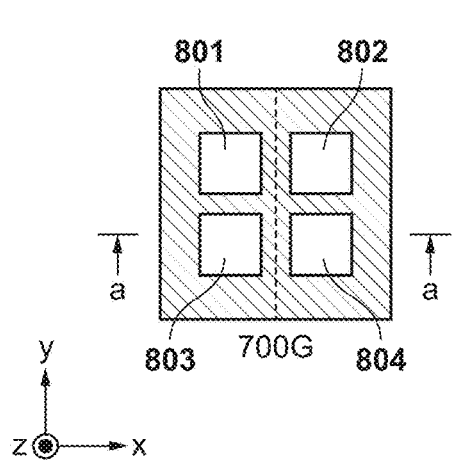
FIGS. 8A and 8B are a schematic plan view and a schematic sectional view, respectively, of a pixel according to the modification.
Figure 8B:
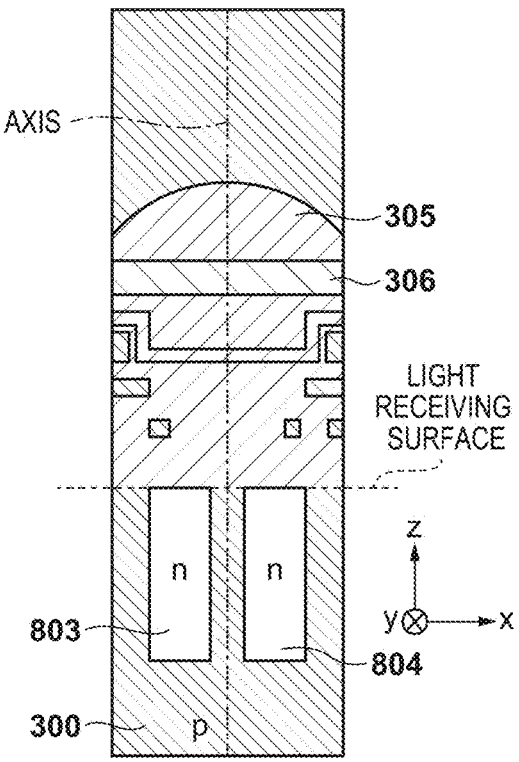

FIG. 8A is a plan view of one pixel 700G of the image sensor 107 shown in FIG. 7 when viewed from the light receiving surface side (+z side) of the image sensor 107, and FIG. 8B is a sectional view showing the a-a section in FIG. 8A viewed from the −y side. As shown in FIGS. 8A and 8B, in the pixel 700G according to the modification, a microlens 305 for condensing incident light is formed on the light receiving side of each pixel. The pixel is divided by NH (here, divided by two) in the x direction and divided by NV (here, divided by two) in the y direction to form first to fourth photoelectric conversion units 801 to 804. The first to fourth photoelectric conversion units 801 to 804 correspond to the first focus detection pixel 701 to the fourth focus detection pixel 704, respectively.

In the modification, by adding signals from the first focus detection pixel 701 to the fourth focus detection pixel 704 for each pixel of the image sensor 107, an image signal (a captured image) with the resolution corresponding to the number of the effective pixels N is generated. Except for this, the modification is similar to the above embodiment.

With the configuration as described above, the focus detection by the on-imaging surface phase difference method is possible over a wide range of conditions in a case where a changing range of the incident angle of light from the imaging optical system on a pixel at a peripheral image height of the image sensor is large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-016173, filed on Jan. 29, 2016 and 2016-234423, filed on Dec. 1, 2016, which are hereby incorporated by reference herein in their entirety.

What is claimed is:

1. An image capturing apparatus in which a plurality of pixels each having a plurality of photoelectric converters for receiving light fluxes that have passed through different partial pupil regions of an imaging optical system are arrayed, wherein
an entrance pupil distance $Z_s$ of the image capturing apparatus with respect to a minimum exit pupil distance $L_{min}$ of the imaging optical system and the maximum exit pupil distance $L_{max}$ of the imaging optical system satisfies a condition of $$\frac{4L_{min}L_{max}}{L_{min}+3L_{max}} < Z_S < \frac{4L_{min}L_{max}}{3L_{min}+L_{max}}.$$

2. The image capturing apparatus according to claim 1, wherein the imaging optical system exchangeable.

3. The image capturing apparatus according to claim 1 wherein the minimum exit pupil distance $L_{min}$ of the imaging optical system with respect to a maximum image height R of the image sensor satisfies the condition of $$L_{min}=R/0.572.$$

4. The image capturing apparatus according to claim 1, further comprising:
a processor;
a light capable of continuously emitting light; and
a communication interface that is controlled by the processor.

5. The image capturing apparatus according to claim 1 further comprising:
a display device for displaying a preview image before image sensing and a captured image for confirming a result of image sensing; and
an operation switch including at least a trigger switch for image sensing.

6. An image sensor in which a plurality of first photoelectric converters and second photoelectric converters that are operated by at least on processor or circuit to receive light fluxes that have passed through different partial pupil regions of an aging optical system respectively are arrayed, wherein
an entrance pupil distance $Z_s$ of the image sensor with respect to a maximum in age height R of the image sensor satisfies the condition of $$2.33R<Z_s<6.99R.$$

7. The image sensor according to claim 6, wherein a plurality of pixels each including the first photoelectric converter and the second photoelectric converter are arrayed, and the first photoelectric converter and the second photoelectric converter divide each of the plurality of pixels in the horizontal direction.

8. The image sensor according to wherein, at the entrance pupil distance $Z_s$ of the age sensor, a first partial pupil region of an imaging optical system substantially corresponds to light receiving regions of the first photoelectric converters of the plurality of pixels, and a second partial pupil region of an imaging optical system substantially corresponds to light receiving regions of the second photoelectric converters of the plurality of pixels.

9. The image sensor according to claim 6, wherein a plurality of pixels each including the first photoelectric converter, the second photoelectric converter, and a microlens are arrayed, and
the entrance pupil distance $Z_s$ of the image sensor is a distance between surfaces of the microlenses of the pixels and a plane on which the partial pupil regions through which one of the plurality of photoelectric converters of the pixels receive light coincide with each other, and the partial pupil regions through which another of the plurality of photoelectric converters of the pixels receive light coincide with each other.

10. The image sensor according to claim 6, wherein size of a light receiving surface of the first photoelectric converter and the second photoelectric converter is 1 a 2 µm.

11. The image sensor according to claim 6, wherein the photoelectric converters generates signals based on incident light for forming a first focus detection signal and the second photoelectric convertors generates signals based on incident light for forming a second focus detection al.

12. The image sensor cording to claim 6, wherein the maximum image height R corresponds to size of the image sensor, a maximum image height of an image to be displayed on a display device, a maximum image height of an image portion to be stored as image data, or an area in which calculation for the focus detection is performed.

13. The image sensor according to claim 6, wherein the maximum image height R corresponds to a size smaller than a size of the image sensor by an amount of a margin used for image processing or image stabilization.

14. An image capturing apparatus that is capable of connecting to an exchangeable imaging optical system comprising the image sensor as described in claim 6.

15. An image capturing apparatus comprising
the imaging optical system; and
the image sensor as described in claim 6.

16. The image capturing apparatus according to claim 15, further comprising:
a light capable of continuously emitting light; and
a communication interface that is controlled by the at least one processor.

17. The image capturing apparatus according to claim 15, further comprising:
a display device for displaying a preview image before image sensing and a captured image for confirming a result of image sensing; and
an operation switch including at least a trigger switch for image sensing.

18. An image capturing apparatus, comprising:
an image sensor including a plurality of first photoelectric converters and second photoelectric converters for receiving light fluxes that have passed through different partial pupil regions of an imaging optical system and a plurality of microlens,
wherein entrance pupil distance $Z_s$ from the plurality of microlens of the image sensor with respect to a minimum exit pupil distance $L_{min}$ of the imaging optical system and the maximum exit pupil distance $L_{max}$ of the imaging optical system satisfies a condition of $$\frac{4L_{min}L_{max}}{L_{min}+3L_{max}} < Z_S < \frac{4L_{min}L_{max}}{3L_{min}+L_{max}}.$$

19. An imaging optical system, comprising:
a plurality of lens group supported so as to be movable forward and backward along an optical axis; and
an aperture for adjusting an amount of light for image sensing performed by an age capturing apparatus in which a plurality of first photoelectric converters and second photoelectric converters for receiving light fluxes that have passed through different partial pupil regions of the imaging optical system are arrayed;
wherein an entrance pupil distance $Z_s$ of the image capturing apparatus with respect to a minimum exit pupil distance $L_{min}$ related to the aperture and the maximum exit pupil distance $L_{max}$ related to the aperture satisfies a condition of $$\frac{4L_{min}L_{max}}{L_{min}+3L_{max}} < Z_S < \frac{4L_{min}L_{max}}{3L_{min}+L_{max}}.$$

20. An image sensor in which a plurality of first photoelectric converters and second photoelectric converters that are, operated by at least one processor or circuit to receive light fluxes that have passed through a first partial pupil region and a second partial pupil region of an imaging optical system respectively are arrayed, wherein
a distance $Z_s$ at which the first partial pupil region substantially corresponds to light receiving regions of the first photoelectric converters and the second partial pupil region substantially corresponds to light receiving regions of the second photoelectric converters, and a maximum image height R of the image sensor satisfies the condition of $2.33R < Z_s < 6.99R.$

* * * * *